United States Patent [19]

Bushnell et al.

[11] Patent Number: 5,514,391
[45] Date of Patent: May 7, 1996

[54] PROCESS FOR REDUCING LEVELS OF MICROORGANISMS IN PUMPABLE FOOD PRODUCTS USING A HIGH PULSED VOLTAGE SYSTEM

[75] Inventors: Andrew H. Bushnell, San Diego; Reginald W. Clark, Del Mar; Joseph E. Dunn, Vista; Samuel W. Lloyd, La Mesa, all of Calif.

[73] Assignee: Pure Pulse Technologies, San Diego, Calif.

[21] Appl. No.: 481,849

[22] Filed: Jun. 7, 1995

[51] Int. Cl.$^6$ ........................................................ A23L 3/00
[52] U.S. Cl. ............................ 426/237; 426/244; 426/521
[58] Field of Search .................................... 426/237, 238, 426/244, 247, 521; 99/451, 455, 470; 422/22

[56] References Cited

U.S. PATENT DOCUMENTS

| | | | |
|---|---|---|---|
| Re. 31,513 | 1/1984 | Glen | 426/521 |
| 918,531 | 4/1909 | Goucher | 426/247 |
| 3,113,872 | 1/1960 | Jones et al. | 426/511 |
| 4,434,357 | 2/1984 | Simpson et al. | 426/237 |
| 4,584,932 | 4/1986 | Abma | 99/470 |
| 4,660,468 | 4/1987 | Goldhahn | 99/470 |
| 4,667,590 | 5/1987 | Balaam et al. | 99/470 |
| 4,962,700 | 10/1990 | Skobic et al. | 99/470 |
| 5,209,157 | 5/1993 | Sanchez Rodriguez | 99/470 |
| 5,290,583 | 3/1994 | Reznick et al. | 426/237 |

*Primary Examiner*—George Yeung
*Attorney, Agent, or Firm*—Fitch, Even, Tabin & Flannery

[57] ABSTRACT

The present invention is directed to methods and apparatuses for preserving fluid foodstuffs. More particularly, it is directed to methods and apparatuses for extending the shelf life of perishable fluid foodstuffs such as dairy products, fruit juices and liquid egg products, which contain significant levels of microorganisms. The improved methods and apparatuses incorporate a plurality of electric field treatment zones with cooling units between each pair of treatment zones in order to maintain the temperature of the pumpable foodstuff at a level at which microorganisms are killed in sufficient numbers and at which changes in the flavor, appearance, odor, or functionality of the foodstuff remain within acceptable ranges. For a comparable microorganism kill, foodstuffs prepared by the present process have significantly higher quality than foodstuffs prepared with standard thermal processes (e.g., ultra-high temperature pasteurization).

35 Claims, 1 Drawing Sheet

PROCESS FOR REDUCING LEVELS OF MICROORGANISMS IN PUMPABLE FOOD PRODUCTS USING A HIGH PULSED VOLTAGE SYSTEM

FIELD OF THE INVENTION

The present invention is directed to improved methods for preserving fluid foodstuffs and for reducing the levels of microorganisms, including bacteria and bacterial spores, in fluid foodstuffs. More particularly, the present invention is directed to methods for preserving and extending the shelf life of fluid foodstuffs which may contain significant levels of microorganisms, including bacteria and bacterial spores. Fluid foodstuffs especially suitable for treatment in the present invention include, for example, dairy products, fruit juices, and liquid egg products. Even more particularly, the present invention is directed to methods for treating and preserving a fluid foodstuff by exposing the fluid foodstuff to multiple pulses of a high strength electric field in a plurality of treatment zones while carefully controlling the temperature of the fluid foodstuff to achieve a significant level of microorganism kill while minimizing exposure to excessively high temperatures which may cause significant and undesirable changes in the flavor, appearance, odor, or function of the foodstuff. By use of the present invention, microorganisms may be killed in liquid foodstuff at significantly reduced temperatures than in currently available thermal-treatment processes. By use of the present invention, foodstuffs with extended shelf lives can be obtained with minimal changes in the flavor, appearance, odor, or function.

BACKGROUND OF THE INVENTION

Substantial technical effort has been directed to the preservation of perishable fluid food products such as milk products, natural fruit juices, and liquid egg products which may contain a wide variety of microorganisms and which are excellent culture media for microorganisms. Practical preservation methods which have found significant commercial application predominantly utilize heat treatment such as pasteurization to inactivate or reduce the microorganism population. For example, milk products are conventionally pasteurized at a minimum temperature of about 72° C. for 15 seconds (or equivalent time/temperature relationships) to destroy pathogenic bacteria and most of the nonpathogenic organisms, with degradative enzyme systems also being partial or totally inactivated. However, products processed in this manner are still generally nonsterile and have limited shelf life, even at refrigeration temperatures and may still contain significant levels of bacteria, bacterial spores, and other microorganisms which are not generally killed, or not completely killed, at the temperatures used. The shelf life of liquid foodstuffs may be substantially extended by higher heat treatment processes such as ultra-high temperature (UHT) pasteurization, which generally employs temperatures from about 94° C. for three seconds to about 150° C. for one second in conjunction with aseptic packaging. Often, destruction of essentially all bacteria and bacterial spores can be obtained at the high temperature range of the UHT pasteurization process. Typically, however, such high temperature treatment adversely affects the flavor of the food product, at least partially denatures proteins contained therein, and/or otherwise adversely affects the desired properties of the fluid food product. Other approaches to liquid food preservation, which also have certain disadvantages, include the use of chemical additives or ionizing radiation.

The bactericidal effects of electric currents have been investigated since the end of the 19th century, with various efforts having been made to utilize electrical currents for treating food products. See, e.g., U.S. Pat. Nos. 918,531, 1,900,509, 2,428,328, 2,428,329, and 4,457,221; and German Patents 1,946,267 and 2,907,887. For example, U.S. Pat. No. 918,531 describes a method of treating milk using relatively low voltage (about 1100 volts) where the milk is cooled during the period of treatment in order to prevent overheating of the milk due to the heating effect of the applied voltage. Generally the lethal effects of low-frequency alternating current with low electric field strength have been largely attributed to the formation of electrolytic chemical products from the application of current through direct contact electrodes, as well as ohmic heating produced by current flow through an electrically resistive medium. As described in U.S. Pat. No. 3,594,115, lethal effects of high voltage arc discharges have also been attributed to electrohydraulic shock waves. However, such electrolytic chemical products may be undesirable in fluid foodstuffs. Thus, the utilization of explosive arc discharges to produce microbiologically lethal shock waves has not found wide-spread application in the provision of edible liquid foodstuffs having extended shelf life.

More recently, separately from the art of food preservation, the effect of strong electric fields on microorganisms in non-nutrient media has been studied as a mechanism for reversibly or irreversibly increasing the permeability of the cell membrane of microorganisms and individual cells. See, e.g., Sale et al., "Effects of High Electric Fields on Microorganisms. III. Lysis of Erythrocytes and Protoplasts," Biochmica et Biophysica Acta, 163, pp. 37–43 (1968); Hulsheger et al., "Killing of Bacteria with Electric Pulses of High Field Strength," Radiat. Environ Biophys, 20, pp. 53–65 (1981); Hulsheger et al., "Lethal Effects of High-Voltage Pulses on E. coli K12," Radiat. Environ. Biophys. 18, pp. 281–288 (1980); Zimmermann et al., "Effects of External Electrical Fields on Cell Membranes, Bioelectrochemistry and Bioenergetics, 3, pp. 58–63 (1976); Zimmermann et al., "Electric Field-Induced Cell-to-Cell Fusion," J. Membrane Biol., 67, pp. 165–182 (1982); Hulsheger et al., "Electric Field Effects on Bacteria and Yeast Cells," Radiat. Environ. Biophys; 22, pp. 149–162 (1983); Zimmermann et al., "The Development of Drug Carrier Systems: Electrical Field Induced Effects in Cell Membranes," Biochemistry and Bioenergetics, 7, pp. 553–574 (1980); Jacob et al., "Microbiological Implications of Electric Field Effects. II. Inactivation of Yeast Cells and Repair of Their Cell Envelope," Zeitschrift fur Allgemeine Mikrobiologic, 21, 3, pp. 225–233 (1981); Kinositas, Jr., "Formation and Resealing of Pores of Controlled Sizes in Human Erythrocyte Membrane," Nature, 268, 4, pp. 438–440 (August, 1977); Neamann et al., "Gene Transfer into Mouse Lyoma Cells by Electroporation in High Electric Fields," IRI Press Limited, Oxford, England, pp. 841–845. The application of high electric fields to reversibly increase the permeability of cells has been used to carry out cell fusion of living cells and to introduce normally excluded components into living cells. Electric fields in non-nutrient media have a direct lethal effect upon microorganisms with the rate of kill dependent upon the field strength above a critical field level and the duration of the applied high voltage pulse or pulses.

These studies postulate the cell membrane as the site of a critical effect, that is, the reversible or irreversible loss of membrane function as the semipermeable barrier between the cell and its environment. An external field of short duration is assumed to induce an imposed trans-membrane potential above a critical electric field value, which may produce a dramatic increase of membrane permeability. Because an increase in cell permeability prevents the counteracting of differences in osmality of the cell content and surrounding media, exchange or loss of cell contents, or cell lysis, irreversible destruction may occur as secondary mechanisms in non-nutrient media which limit the ability of cells to repair themselves, and which adversely affect permeable cells through osmotic pressure differences between the medium and the interior of the cell.

Even more recently, U.S. Pat. Nos. 4,695,472, 4,838,154, 5,048,404, and 5,235,905 have provided methods and apparatuses for providing fluid food products having extended shelf life using electric field treatment. These methods and apparatuses generally allow the temperature of the fluid to be treated to increase due to ohmic heating effects during application of the electric field. Such increases in temperature can result in reduced quality of the fluid treated. Such deleterious effects on the quality of the fluid can include changes in flavor, color, appearance, aroma, functionality of proteins, and the like. Although, in many cases, such changes may not significantly effect the use of the treated fluid, they can still have a significant affect on the ultimate consumer's acceptance of the food product. In these prior art methods, the temperature was prevented from reaching excessively high levels by either decreasing the electric field strength or decreasing the duration of treatment which will, of course, decrease the efficiency of microorganism kill. Generally, it has been found that these processes, while providing excellent levels of general microorganism kill, often do not provide the levels of bacteria, bacterial spore, and/or fugal spore kill that would generally be desired. Moreover, it has generally been found that high temperature processes, such as, for example, UHT pasteurization, often provide good levels of bacteria and bacterial spore kill but with significant and adverse changes in the flavor, appearance, odor, and/or function of the product. Thus, it would be desirable to provide improved methods whereby foodstuffs can be treated with pulsed electric fields, especially for longer periods of time and at higher electric field strengths, whereby bacteria and bacterial spore levels can be significantly reduced or eliminated while minimizing the detrimental effects caused by elevated process temperatures.

Accordingly, it is an object of the present invention to provide methods for extending the shelf life of perishable pumpable food products such as dairy products, natural fruit juices, fluid egg products, beer, wine, soups, stews, gravies, particulate food suspensions or slurries, and other pumpable food products while minimizing the exposure of the food product to excessive temperatures at which significant and undesirable changes tend to occur in the flavor, appearance, odor, or function of the food products. Another object of the present invention is to provide a process for preparing a pumpable foodstuff with significantly reduced levels of microorganisms, said process comprising:

(1) preheating a pumpable foodstuff to a temperature in the range of about 30° to 120° C.;

(2) passing the pumpable foodstuff of step (1) through a plurality of treatment zones arranged in series, wherein the pumpable foodstuff is passed through each treatment zone in turn, wherein the pumpable foodstuff in each treatment zone is subjected to multiple pulses of an electric field having a field strength of at least 10 kV/cm;

(3) cooling the pumpable foodstuff after passage through each treatment zone in step (2), except the last treatment zone, so that the temperature of the pumpable foodstuff entering the next treatment zone is in the range of 30° to 120° C.; and (4) rapidly cooling the pumpable foodstuff from the last treatment zone in step (2) to a storage temperature;

wherein the temperature of the pumpable foodstuff in each treatment zone in step (2) is maintained below a predetermined temperature and wherein the total duration of electric field treatment and the temperature of the pumpable foodstuff in the treatment zones are sufficient to provide a foodstuff with significantly reduced microbial levels with minimal changes in the flavor, appearance, odor, or function.

Still another object of the present invention is to provide a process for preserving a pumpable foodstuff, said process comprising:

(1) passing a pumpable foodstuff through a plurality of treatment zones arranged in series, wherein the pumpable foodstuff is passed through each treatment zone in turn and wherein the pumpable foodstuff is subjected to multiple pulses of electric fields having field strengths of at least 10 kV/cm in the plurality of treatment zones;

(2) cooling the pumpable foodstuff after passage through each treatment zone in step (1), except the last treatment zone, before it enters into the next treatment zone; and (3) rapidly cooling the pumpable foodstuff from the last treatment zone in step (1) to a storage temperature;

wherein the temperature of the pumpable foodstuff in each treatment zone in step (2) is maintained below a predetermined temperature and wherein the total duration of electric field treatment and the temperature of the pumpable foodstuff in the plurality of treatment zones are sufficient to preserve the pumpable foodstuff while minimizing changes in the flavor, appearance, odor, or function of the pumpable foodstuff.

These and other objects of the present invention will become apparent from the following detailed description and the accompanying drawings.

DESCRIPTION OF THE INVENTION

Figure 1:
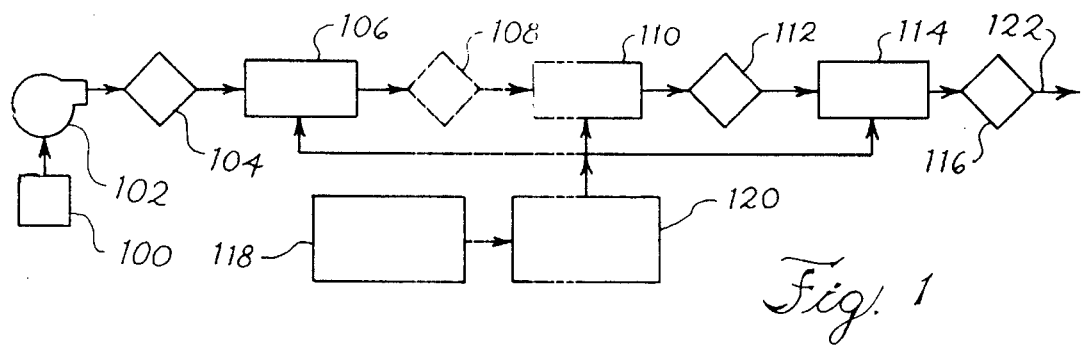
FIG. 1 is a simplified flow diagram illustrating a processing system for extending the shelf life of perishable pumpable foodstuffs utilizing a treatment system capable of applying very high electric field stress to a pumpable food product in a plurality of treatment zones while maintaining the pumpable food product in an acceptable temperature range for killing microorganisms while minimizing undesirable effects on the foodstuff in accordance with the present invention.

Generally in accordance with the present invention, a method is provided for preserving fluid foodstuffs, especially fluid foodstuffs which are normally bacteriological growth media, by applying high voltage electrical field pulses of very short duration in a plurality of treatment zones while maintaining the temperature of the fluid foodstuff at a level at which significant microorganism kill occurs while minimizing the detrimental effects associated with high temperatures. By use of the present invention, significant reductions of microorganisms, including bacteria and bacterial spores, can be obtained in processed foodstuffs. By use of the present invention, foodstuffs with extended shelf lives can also be obtained with minimal changes in flavor, appearance, odor, and/or function.

In one embodiment, a method is provided for preserving and extending the shelf life of a pumpable food product using relatively low temperatures to minimize undesirable change in the flavor, appearance, odor, or function of the foodstuff. In this embodiment, the foodstuff is kept below a relatively low predetermined temperature, selected for each type of foodstuff, during the entire process. This relatively low temperature, while preserving the foodstuff with minimal undesirable change in flavor, appearance, odor, or function, may not kill some microorganisms, especially resistant bacteria and bacterial spores, that may be present. Thus, in another embodiment, a method is provided for treating a fluid foodstuff at a relatively high predetermined temperature in order to more completely kill bacteria and bacterial spores. But even in this embodiment, the duration of exposure to the high temperature is such that only minimal and acceptable changes in flavor, appearance, odor, or function of the foodstuff occurs. The high temperature embodiment is generally "nondiscriminatory," by which is meant that most types of microorganism, including bacteria and bacterial spores, are killed (or at least reduced to acceptable levels) under the process conditions. Types of bacteria and bacterial spores which are killed include, for example, bacteria and spores of the genus Bacillus and Clostridium (such as *Bacillus stearothermophilus, Bacillus pumulus, Bacillus subtilis, Clostridium sporogenes, Clostridium botulinum,* and the like) and fungal organisms or spores. Moreover, other non-bacterial and less resistive microorganisms, which may also be present in foodstuffs, are generally killed under conditions at which bacteria, bacterial spores, fungi, and fungal spores are killed.

Thus, the present invention allows the production of foodstuffs having significantly reduced levels of microorganisms (including bacteria, bacterial spores, fungi, and fungal spores) and having extended shelf-lives. Such advantages for the high temperature process must be traded off with more potential detrimental (although still acceptable) changes in the flavor, appearance, odor, and/or function of the treated foodstuff as compared to the low temperature process. Of course, the higher temperature process will result in higher microorganism kill rates and, therefore, even more extended shelf-lives. The maximum temperatures, electric pulse rate and strengths, and durations in the treatment cells can be balanced to achieve the desired shelf-life and sensory qualities for the foodstuff. The lower temperature process will generally be preferred when a preserved foodstuff with the highest sensory quality is required or desired. The higher temperature process will generally be preferred when a preserved foodstuff with an even further extended shelf life is desired as it will result in the maximum microorganism (including bacteria, bacterial spore, fungi, and fungal spore) kill rates.

As one skilled in the art will realize, the two embodiments discussed above differ mainly in the value of the predetermined temperature at which the electric field treatment is carried out. The lower temperature process provides extended shelf-life foodstuffs with minimal changes in flavor, appearance, odor, and function. The higher temperature process provides even more extended shelf-life foodstuffs, with lower levels of surviving microorganisms, but with somewhat more undesirable changes in the foodstuff. The selection of the process to use (i.e., low temperature or high temperature) will depend on the specific foodstuff to be treated, the packaging and storage methods used, and the foodstuff's intended use. By varying the temperature of the process, the shelf life and sensory qualities of the treated foodstuff can be adjusted and balanced as desired.

By "pumpable foodstuff" is meant an edible food product having a viscosity or extrusion capacity such that the food product may be forced to flow through a series of treatment zones. The products include extrudable products, such as dough or meat emulsions, fluid products such as beverages, fluid dairy products, natural fruit juices, fluid egg products, gravies, sauces, soups, and food-particulate containing food slurries such as stews, soups, cooked or uncooked vegetable slurries, and grain slurries. Preferably, the liquid phase food product will have a viscosity of less than about 1000 poise, and preferably less than about 500 centipoise, at a temperature above 0° C. Typically, suitable pumpable food products contain from about 20 to about 95 percent by weight water, and from about 4 to about 75 percent by weight of solids selected from the group consisting of proteins, carbohydrates, fats, and mixtures thereof, based on the total weight of the foodstuff. The viscosity of the foodstuff may generally best be determined at ambient temperature (e.g., about 23°–25° C.). By "bacteriological growth medium" is meant that upon storage at a temperature in the range of 0° C. to about 30° C., the fluid foodstuff, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight, pH, or other qualitative or quantitative analytical methodology for monitoring increases in biological activity or content. For example, under such conditions the microbiological population of a pumpable foodstuff which is a bacteriological growth medium may at least double over a time period of two days. Preferably, the fluid foodstuffs will have an electrical conductivity of at least about 0.00001 mhos/cm, although deionized food products may also be treated which have lower conductivities. Typically, pumpable food products may have a combined sodium and potassium content of at least about 0.10 weight percent, based on the total weight of the fluid foodstuff. It is noted that deionized water may be used as a slurrying agent for the high pulsed electric field treatment of particulate cooked, hydrated, uncooked, or unhydrated food products. The compositions of some typical fluid food products, which are biological growth media, derived from "Nutritive Value of American Foods in Common Units," Agriculture Handbook No. 456 of the U.S. Department of Agriculture (1975), are as follows:

| Fluid Food Product | FLUID FOODSTUFFS | | | | | |
|---|---|---|---|---|---|---|
| | Water Wt % | Protein Wt % | Fat Wt % | Carbohydrate Wt % | Na Wt % | K Wt % |
| Whole Milk (3.5% fat) | 87.4 | 3.48 | 3.48 | 4.91 | .05 | .144 |
| Yogurt** | 89.0 | 3.40 | 1.68 | 5.22 | .05 | .142 |
| Raw Orange | 88.3 | .685 | .20 | 10.0 | .0008 | .2 |

FLUID FOODSTUFFS

| Fluid Food Product | Water Wt % | Protein Wt % | Fat Wt % | Carbohydrate Wt % | Na Wt % | K Wt % |
|---|---|---|---|---|---|---|
| Juice | | | | | | |
| Grape Juice | 82.9 | .001 | trace | .166 | .0019 | .115 |
| Raw Lemon Juice | 91.0 | .41 | .20 | 8.0 | .0008 | .14 |
| Raw Grapefruit Juice | 90.0 | .48 | .08 | 9.18 | .0008 | .16 |
| Apple Juice | 87.8 | .08 | trace | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split Pea Soup* | 70.7 | 6.99 | 2.60 | 16.99 | .77 | .22 |
| Tomato Soup* | 81.0 | 1.60 | 2.10 | 12.69 | .79 | .187 |
| Tomato Catsup | 68.6 | 2.0 | .588 | 25.4 | 1.04 | .362 |
| Vegetable beef soup | 91.9 | 2.08 | .898 | 3.9 | .427 | .066 |

*condensed - commercial
**from partially skimmed milk

The present invention is directed to methods for the preservation and treatment of a pumpable food product utilizing high electric field pulses of short and controlled pulse durations in a plurality of treatment zones with cooling between each treatment zone so as to maintain the temperature of the pumpable food product at levels so that microorganisms are killed while maintaining the quality of the pumpable food product. The quality of the food product is maintained by minimizing changes in the flavor, appearance, odor, and/or functionality resulting from thermal effects. Generally, it is preferred that the predetermined temperature be kept below about 100° C. for the low temperature process and below about 150° C. for the high temperature process throughout the electric field treatment process in order to minimize thermal effects on the sensory quality of the treated foodstuff, while applying a sufficient high electric field to provide the desired microorganism kill. Such electric fields may be applied, for example, by means of treatment cells of high field stability design as described in U.S. Pat. Nos. 4,695,472, 4,838,154, 5,048,404, and 5,235,905, all of which are incorporated by reference. The use of pressurization or degassing methods to facilitate the use of high electric fields can also be incorporated into the methods of the present invention.

As indicated, in accordance with the present invention, all of the pumpable fluid foodstuff is subjected to high field and current intensity electric pulses in a plurality of treatment zones arranged in series. As the pumpable foodstuff exits one treatment zone (except the last one), it is cooled to a desired temperature range using any suitable heat exchanger, chiller, or other cooling means before entering the next treatment zone for further electric field treatment. By balancing the heating effects of the treatment zones with the cooling effects of the cooling zones, the temperature of the pumpable foodstuff can be maintained below the predetermined temperature throughout the process. Preferably, the pumpable foodstuff exiting the last treatment zone is cooled to refrigeration temperatures as described in more detail below. The duration of each treatment zone is controlled so that temperature increase of the pumpable fluid foodstuff in a particular treatment zone due to ohmic heating is sufficiently low that the temperature of the pumpable fluid foodstuff is maintained at a level allowing the desired microorganism kill while minimizing thermal effects which could significantly impair the flavor, appearances odor, or functional aspects of the pumpable fluid foodstuff. The duration of electric field treatment, summed over all the treatment zones, the strength of the electric field, and the electric field treatment temperature should be adjusted and maintained to afford the desired degree of microorganism kill. Indeed, one of the advantages of the present system is that the pumpable foodstuff can be exposed to longer total periods of electric field treatment than was possible in prior electric field treatment systems. Without the cooling stages or system of the present invention, extended exposure to high electric fields (whether in a single treatment zone or multiple treatment zones) sufficient to treat the foodstuff would result in excessive temperatures well above the levels employed in the present invention. Such excessive temperatures would generally cause unacceptable changes in the flavor, appearance, odor, and/or function of the foodstuff.

In the present system, the period of time the pumpable foodstuff is subjected to a high electric field in each treatment zone is relatively low (generally residence times in the order of less than about 10 seconds, and more preferably less than about 1 second, per zone) in order to keep the ohmic heating, and thus temperature levels, within acceptable limits. By cooling the pumpable foodstuff between each treatment zone, the number of treatment zones (and, thus, the total duration of the electric field treatment) can be extended to the desired level while minimizing the exposure of the treated foodstuff to high temperatures.

Generally it is preferred that at least two electric field treatment cells or zones be employed, and that the temperature in the electric field treatment cells or zones be maintained at a temperature less than about 100° C. for the low temperature process and less than about 150° C. in the high temperature process. More preferably, the present invention employs at least two electric field treatment cells or zones and treatment temperatures of about 40° to 90° C. in the low temperature process and about 70° to 135° C. in the high temperature process. Although larger numbers of treatment zones can be used, it is generally preferred that the number of treatment zones be in the range of about 2 to 10, and more preferably in the range of about 2 to 4. Each treatment cell or zone preferably has an electric field strength of at least 10 kV/cm, more preferably, at least 25 kV/cm, and even more preferably, at lease 35 kV/cm. As those skilled in the art will understand, a larger number of treatment zones, different field strengths, and longer periods of treatment can be used and may, in some cases, even be preferred. It is not necessary that each treatment cell or zone utilize the same physical design, electric field strength, pulse rate, duration of treatment, or other operational parameters. For of ease of construction and operation, however, it is generally preferred that each treatment cell or zone is of similar design and is operated in a similar manner.

The pumpable food product may be subjected to such very high voltage short duration pulses in the plurality of treatment zones by a variety of processing techniques. In one such preferred processing method, the liquid foodstuff is introduced into a treatment zone between two electrodes which have a configuration adapted to produce a electric field therebetween without dielectric tracking or other breakdown. High voltage electric pulses may be applied to the electrodes to subject the liquid foodstuff to the multiple pulse treatment by pulsed field apparatus such as lumped transmission line circuits. Blumlein transmission circuits, and/or capacitive discharge circuits. Field reversal techniques may also be utilized by capacitive discharge systems and pulse forming networks to increase the effective potential across the treatment cell or zone. Thus, by applying a short pulse of, for example, 20 kV/cm across a treatment cell or zone for a short period of time (e.g., 2 microseconds) of one polarity, followed by abrupt reversal of the applied potential within a short time period (e.g., 2 microseconds), an effective field approaching 40 kV/cm may be developed across the treatment cell or zone. If the liquid foodstuff is continuously introduced into a treatment zone to which very high voltage pulses are periodically applied, and fluid foodstuff is concomitantly withdrawn from that treatment zone, the rate of passage of the liquid foodstuff through the plurality of treatment zone preferably should be coordinated with the pulse treatment rates so that all of the pumpable foodstuff is subjected to at least one pulse, and more preferably multiple pulses, within the treatment zones. More preferably, the pumpable foodstuff should be subjected to at least one pulse within each of the treatment zones. Even more preferably, the pumpable foodstuff is subjected to several pulses within each of the treatment zones. As one skilled in the art will realize, it is not necessary that the pumpable fluid be subjected to at least one electric pulse within every treatment zone (although that is the preferred mode of operation) so long as the pumpable fluid receives sufficient electric pulses over the entire series of treatment zones in order to achieve the desired microorganism kill.

A suitable apparatus for preservation of pumpable foodstuffs of the present invention generally comprises a plurality of electric field treatment chambers or zones and a plurality of cooling means located between the electric field treatment chambers or zones for maintaining the temperature of the pumpable foodstuff within acceptable limits. Generally each electric field treatment chamber or zone contains a first electrode means for making electrical contact with liquid foodstuff disposed adjacent to said first electrode means in said chamber, a second electrode means spaced apart from said first electrode means for making electrical contact with liquid foodstuff disposed in said chamber between said first electrode means and said second electrode means. Advantageously, the apparatus may include a solid dielectric separator means comprising a dielectric nonconductive spacer separating said first electrode means and said second electrode means externally of said chamber and having a minimum surface pathway length between said first electrode means, and said second electrode means of at least twice, and preferably at least three times, the minimum distance between said first electrode means and said second electrode means in said chamber. The electrodes will also desirably be constructed such that the electric field strength at the edges of the electrode (upon application of a pulsed electric potential) does not significantly vary from the average electric field over the surface of the electrode. This may be accomplished by proper electrode design, such as, for example, rounding the electrode edges to prevent undesirable field enhancement at sharp edges of small radius of curvature. The apparatus further comprising an inlet conduit means for introducing a pumpable foodstuff to be treated into the first electric field treatment chamber, conduit means for passage of the treated foodstuff discharged from each treatment chamber to the next treatment chamber, an outlet conduit means for discharging food product which has passed through the last treatment chamber in series, means for applying high voltage electrical pulses to each of the first and second electrode means in each treatment chamber, preferably at a predetermined rate of at least about 0.01 pulse per second and more preferably at least about 2 pulses per second, to provide an electric field between the electrodes (and through the pumpable foodstuff located therebetween) of at least about 10 kV/cm, preferably at least about 25 kV/cm, and more preferably at least about 35 kV/cm. The apparatus further includes means for cooling the foodstuff during its passage between treatment zones so as to maintain the temperature of the foodstuff within acceptable and desirable limits at all times. Suitable cooling means include, for example, conventional heat exchanger, chillers, and the like. Thus, the foodstuff, after treatment in a given treatment zone, is cooled to acceptable and desirable temperatures before entering the next treatment zone. The apparatus may further include, and preferably does include, means for preheating the foodstuff to a predetermined temperature (generally in the range of about 10° to 100° C. and more preferably in the range of about 40° to 75° C.) before it is introduced into the first treatment chamber or zone. The apparatus may further include, and preferably does include, means for rapidly cooling the fluid foodstuff to a storage temperature soon after the fluid foodstuff passes through the last treatment zone. For purposes of this invention, "storage temperature" is a temperature near or below ambient temperature. More preferably this storage temperature is a refrigeration temperature in the range of from about 0° to about 10° C. Preferably, the fluid foodstuff is cooled to refrigeration temperatures within about 30 minutes, and more preferably within about 10 minutes, after treatment in the last treatment zone. The apparatus may further include, and preferably does include, means for aseptic packaging of the fluid foodstuff after treatment in the present process.

The treatment chambers may be constructed using stainless steel electrodes. In other cases, more electrochemically inert electrode materials may be advantageously used. For example, carbon may provide a suitable electrode material; and other electrode materials such as gold, platinum, and metal oxides such as iridium oxide and ruthenium oxide may provide increased electro-chemical inertness. If desired, the first and second electrodes in the treatment chambers may be constructed to prevent direct electrolysis of the fluid foodstuff upon application of a pulsed electric field thereto. In this regard, such electrodes may comprise an electrically conductive electrode, an ion permeable membrane, and an intermediate electrolyte, such that ionic electrical connection is made with the fluid foodstuff through the ion permeable membrane rather than by direct contact with the electronically conductive electrode. Such treatment chambers are described in U.S. Pat. No. 4,695,472.

As indicated, in accordance with the present invention, methods are provided for processing of pumpable liquids, including thick and viscous fluids, solutions, slurries, and/or mixtures of liquids and solid particulates with pulsed electric fields while maintaining the temperature of the pumpable liquid at levels in which sufficient microorganism spore kill occurs while minimizing adverse changes to the flavor, appearance, odor, and/or function of the pumpable liquid. The material to be treated should be maintained under substantially sterile conditions throughout the process. Preferably the treated foodstuff is packaged after treatment to provide a packaged food product having extended shelf life. More preferably, the treated material is maintained and packaged under aseptic conditions after being subjected to the pulsed electric field treatment of the present invention.

In order to maintain high electric fields in the treatment chamber, it is desirable that the pumpable food product be void-free. In addition, it is desirable that the capacity of the food product to evolve gas bubbles under electric field treatment conditions be minimized. Accordingly, high electric field processing methods should best include the control of gases absorbed in the pumpable food. The effect of absorbed gas in the pumpable food is to cause electrical breakdown in the pumpable food. This can be avoided by degassing the pumpable food by means of a vacuum pump and a degassing arrangement or other method to remove the suspended, dissolved, or trapped gas from the pumpable food. Another approach which helps minimize the potential for electrical breakdown in the pumpable food is to perform the treatment with the pumpable food under pressure. Use of positive pressure on the pumpable food reduces the formation of gas bubbles in the pumpable food which can lead to electrical breakdown when high electric fields are applied and generally reduces the likelihood of electrical breakdown. Pressures up to 1000 psi or more may be used in the process.

In accordance with various preferred aspects of the present invention, the treatment of fluid foodstuff is carried out at a temperature in which sufficient microorganism kill occurs but which minimizes significant temperature excursions in the foodstuff and undesirable changes in flavor, appearance, odor, and/or function of the foodstuff. By employing a plurality of electric field treatment zones, the foodstuff can be exposed to sufficient electric pulses to achieve the desired level of treatment without prolonged exposure to excessive temperatures. The length of exposure to high temperatures can, therefore, be significantly less, for a given level of microorganism kill, than a process using only thermal treatment. Thus, a foodstuff with extended shelf life can be prepared in the present process with significantly less exposure to potentially damaging temperatures. In addition, by promptly cooling the electric field treated liquid foodstuff to a storage temperature (preferably a temperature of less than about 10° C., and more preferably in the range of from about 0° C. to about 5° C.), further substantial improvement in shelf life may be obtained, and the process made more effective. Preferably, as described in U.S. Pat. No. 4,695,472, the food product should be cooled to refrigeration temperature within 30 minutes, and preferably within about 10 minutes, of completion of the electric field treatment. The high voltage electrical field treated fluid foodstuff may be rapidly cooled by means of continuous flow heat exchange units prior to packaging or bulk storage. In this manner, it is believed that electrically treated organisms having cell wall damage may be cooled to an inactive condition before cell wall repair may be accomplished, thereby enhancing the product shelf life.

Electric field treatment should best be carried out with pulses having an electric field strength in the range of at least about 10 kV/cm, preferably in the range of at least about 25 kV/cm, and most preferably in a range of from about 35 to about 120 kV/cm. Generally, pulse duration in each treatment zone should be in the range of from about 0.01 to 25 microseconds, and most preferably between 0.1 and 10 microseconds. Longer pulse times can be used so long as the increased ohmic heating is taken into account and the temperature in each treatment zone is maintained in the desired range via operation of the cooling units or zones between the treatment zones. Thus, pulse times and duration of treatment within a given treatment zone and the cooling effects of the cooling units should be selected and balanced so that the temperature of the foodstuff in the treatment zone is maintained in the desired range to assist in achieving the desired degree of pulsed electric field microorganism kill and to maintain the flavor, appearance, odor, and/or function of the foodstuff within acceptable limits. By using a plurality of treatment zones with temperature control between each set of treatment zones, sufficient total treatment times can be obtained in the present invention, as compared with prior art UHT pasteurization processes or single electric pulse field treatment processes, while minimizing the exposure of the foodstuff to potentially damaging temperatures.

Preferably the pumpable foodstuff is preheated to a temperature of about 10° to 100° C., and preferably to a temperature of about 40° to 75° C., before the first electric field treatment zone. Heat applied before electric field treatment may be used to produce higher microbiological kill rates in the fluid foodstuff in the first treatment zone as compared to treatment of a colder material. As one skilled in the art will realize, it is not necessary, however, to preheat the pumpable foodstuff in the present invention. Cold feed materials (e.g., less than about 10° C.) can be used without preheating, if desired. Such cold feed material are effectively heated to the desired temperature ranges during the initial portion or portions of the treatment process by ohmic heating attendant to the high voltage electric filed pulses (i.e., in the first or first few treatment zones). The use of a preheater is, however, generally preferred. During the process, temperature increases due to ohmic heating in each treatment zone are controlled by cooling the treated foodstuff between the various treatment zones in order to maintain the temperature in the treatment zones at the desired levels (i.e., below the predetermined value). For the low temperature process, the temperature in the treatment zones is generally maintained below a predetermined value in the range of about 40° to 100° C., and preferably of about 55° to 95° C., by cooling the foodstuff before it enters the next treatment zone. For the high temperature process, the temperature in the treatment zone is generally maintained below a predetermined value in the range of about 80° to 150° C., and preferably of about 85° to 130° C., by cooling the foodstuff before it enters the next treatment zone. The heating of the foodstuff during treatment due to ohmic heating to a temperature stressful (but not necessarily lethal) to microorganisms is believed to increase damage sustained during treatment. This may occur through an increase in membrane fluidity or porosity, producing greater damage per treatment dosage, a decrease in the capability of the damaged microorganism to effect repair during and after treatment due to the disruptive effects of such stressful temperature elevation upon cellular metabolism, and/or an increase in any osmotic effects secondary to the electric field membrane damage. Thus, when it is desired to significantly reduce fungal and fungal spore levels, it is generally preferred that the temperature of the foodstuff be maintained at as high a level as possible, but below about 100° C., in order to minimize significantly losses of flavor and undesirable changes in appearance, odor, or function. By providing cooling means between the treatment zones, the total treatment time can be increased in order to obtain high levels of spore kill while minimizing the exposure of the foodstuff to temperatures sufficiently high to cause significant losses of flavor and undesirable changes in appearance, odor, or function of the foodstuff. By rapidly cooling the electrically treated fluid foodstuff to a refrigeration temperature after passage through the complete series of treatment zones, it is believed that the normal cellular mechanisms for repair or decrease of the electric field-induced cell membrane permeability are retarded, thereby increasing cell vulnerability and decreasing the reproductive capacity of any remaining microorganisms, bacteria, fungi, and/or spores which survive the electric field treatment.

In nutritive media such as milk, natural fruit juices, and natural liquid egg products, cells that are actively growing at the time of treatment may recover under appropriate conditions. However, in accordance with the present invention, effective processing may be carried out in nutritive media by temperature control during and after the treatment process. Incubation at refrigeration temperatures after treatment can reduce the metabolic level of electrically treated microorganisms that might survive and hence tend to diminish recovery and repair. Similarly, increasing the total length of time to which such cells are exposed to electric field treatment, the electric field strength, and the temperature may be used to increase the kill level. The total treatment time is defined as the sum of the treatment times in each treatment cell over the plurality of treatment cells.

As indicated above, the cooling units between each treatment cell or zone is designed to keep the temperature of the foodstuff to be treated within acceptable ranges during the treatment process. The temperature of the treated foodstuff increases in each treatment zone due to ohmic heating effects. Thus, in order to maintain the temperature of treated foodstuff in acceptable ranges, it is necessary to cool the treated foodstuff exiting from one treatment zone (with its increased thermal content) before it enters the next treatment zone for additional electric field treatment (and additional ohmic heating). Thus, the temperature of the foodstuff throughout the process can be kept in acceptable temperature ranges. An "acceptable temperature range" is that range of temperatures which, for a giver foodstuff, provides acceptable kill rates and kill amounts of microorganisms but which minimizes significant and detrimental effects in the flavor, appearance, odors or function of the foodstuff. The predetermined temperature value is normally selected within the acceptable temperature range depending on the specific foodstuff to be treated and its desired properties and intended use. As those skilled in the art will realize, the maximum temperature to which a foodstuff can be exposed to achieve these objectives will depend, in large part, upon the particular foodstuff treated and the levels and types of microorganisms, including bacteria, fungi, bacterial spores, and fungal spores, present. Different foodstuffs will generally have different temperatures to which they can be exposed without significant damage. In order to minimize such detrimental changes, it is generally preferred that milk products not be exposed to a predetermined temperature higher than about 80° C. for the low temperature process and about 140° C. for the high temperature process for any significant length of time. Likewise, natural fruit should generally not be exposed to temperatures higher than about 80° C. for the low temperature process and about 140° C. for the high temperature process for any significant length of time. Likewise, liquid egg products should generally not be exposed to temperatures higher than about 75° C. for any significant length of time.

Having generally described various aspects of the present invention, the process of the present invention will now be described using the process illustrated in FIG. 1 with milk as an illustrative pumpable food product. The low temperature process and the high temperature process are essentially the same except for the allowable and acceptable temperatures (i.e., different predetermined temperatures) in the various treatment zones. As shown in FIG. 1, the milk to be treated is pumped from storage reservoir 100, via pump 102, to preheater 104 where the temperature is raised to about 15° to 100° C. From preheater 104, the milk is conveyed to the first electric field treatment chamber or zone 106 where it is exposed to a high strength electric field. After passage through the first electric field treatment chamber or zone 106, the treated milk is cooled in heat exchanger or cooling unit 108. The cooled milk from heat exchanger 108 is then conveyed to a second electric field treatment chamber or zone 110 where it is once again exposed to a high strength electric field. After passage through the second electric field treatment chamber or zone 110, the further treated milk is cooled in heat exchanger or cooling unit 112. The cooled milk from heat exchanger 112 is then conveyed to a third electric field treatment chamber or zone 114 where it is once again exposed to a high strength electric field. After passage through the third electric field treatment chamber or zone 114, the fully treated milk is rapidly cooled to refrigeration temperatures (generally less than about 10° C.) in chiller 116 and then removed from the process via line 122 for bulk storage, individual packaging, or aseptic packaging (not shown). The electric pulses applied to treatment chambers or zones 106, 110, and 114 are controlled through pulse modulator 120 and power supply 118. Electric field treatment chambers 106, 110, and 114 are arranged in series with heat exchangers 108 and 112 located between the treatment chambers (i.e., heat exchanger 108 between chambers 106 and 110 and heat exchanger 112 between chamber 110 and 114). The number of treatment chambers or zones could be easily increased by simply added additional treatment chambers 110 and associated heat exchanger 112, in the series illustrated in FIG. 1. In this manner, as many treatment chambers or zones could be added as desired. Generally, the number of treatment zones (and associated cooling units) is at least two and preferably greater than two.

As shown in FIG. 1, a single pulse modulator 120 is used to operate each of the treatment chambers 106, 110, and 114. Thus, in the process illustrated in FIG. 1, the fluid in each of the treatment chamber will be treated or exposed to essentially the same electric field (i.e., field strength and pulse rate). If desired, more than one pulse modulator could be employed so that different electric field profiles could be used in different treatment chambers in the process; or a single modulator could be modified so as to allow different electric field profiles in different treatment chambers. Likewise, the treatment cells 106, 110, and 114 can be of the same or different design and have the same or different residence times. Generally, however, it is preferred that each treatment cell be of the same or similar design to simplify construction and maintenance of the process. Preferably, the treatment cells are long pathway uniform electric field treatment cells having very high field stability coaxial design as described in U.S. Pat. No. 5,235,905. Preferably, appropriate cell monitors (not shown) are included in the process in order to monitor the temperature and voltage conditions within each treatment cell. Data from such cell monitors can be used to adjust and control the cooling effect in the cooling units 108 and 112 located between treatment chambers to insure that the milk or other food product is maintained in the desired temperatures ranges which will result in the desired level of microorganism kill while minimizing adverse changes in flavor, appearance, odor, or function of the product being treated. For milk, it is generally preferred that the temperature not be allowed to rise to levels over about 80° C. for any significant time in the treatment cells or zones in the low temperature process and about 140° C. in the high temperature process. Preferably, the temperature of the treated milk within the treatment cells or zones should be maintained in the range of 40°0 to 60° C. for the low temperature process and about 110° to 130° C. for the high temperature process.

As noted above, the treated liquid food product is conducted to chiller or refrigeration unit 116 where it is rapidly cooled to a storage temperature (preferably less than about 10° C., and more preferably less than about 5° C.). Preferably the treated liquid food product is cooled within about thirty minutes, and more preferably within about ten minutes, of the completion of the pulsed electric field treatment. In the embodiment shown in FIG. 1, the refrigeration unit is used to rapidly cool the product in an energy efficient manner immediately after the last electric field treatment unit. The product may also be cooled after it is packaged. Preferably, the cooled, electrically treated liquid food product stream is introduced as an input stream to aseptic packaging apparatus (not shown) which packages the product in sterilized containers under sterile conditions. Such packaged product containers can be, if desired, maintained under refrigeration conditions by appropriate refrigeration storage apparatus until distribution to the consumer. Such storage apparatus may include refrigeration storage units at the packaging plant, refrigeration transport units in the distribution system, and refrigeration storage units at the distribution warehouse, grocery store, or other consumer distribution center. Because of the extended shelf life properties provided by the electric pulse treatment of the present invention, such refrigerated storage may be carried out over an extended period of time while maintaining the freshness and keeping qualities of the processed food product.

It may also be desirable to degas the liquid food product issuing from a treatment zone prior to its introduction into the next treatment cell in the treatment apparatus. Accordingly, for example, one or more vacuum degassing units (not shown) may be provided in the outlet conduits of the treatment chambers or zones for degassing of the output stream to produce a degassed, treated stream for introduction into the next treatment chamber or zone. A single degassing unit may be provided on the outlet side of each treatment chamber or one degassing unit may be used for more than one treatment chamber.

From the previous description, it will be appreciated that systems may be designed to treat pumpable food products on a batch, semi-continuous, or continuous basis. Preferably the process of the present invention is operated on a continuous basis. Design of such high voltage pulsed electric field systems may utilize some basic relationships, as fully described in U.S. Pat. Nos. 5,048,404 and 5,235,905, to determine power requirements, pulse modulator specifications, and treatment cell design.

Figure 2A:
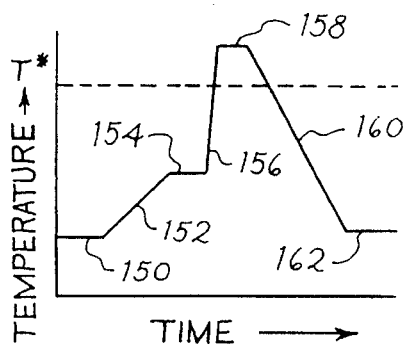
FIG. 2 illustrates typical temperature/time profiles for (A) a process using a single electric field treatment zone and (B) the process illustrated in FIG. 1 using three electric field treatment zones in accordance with the present invention. The profile shown in FIG. 2A is for comparison purposes only.
Figure 2B:
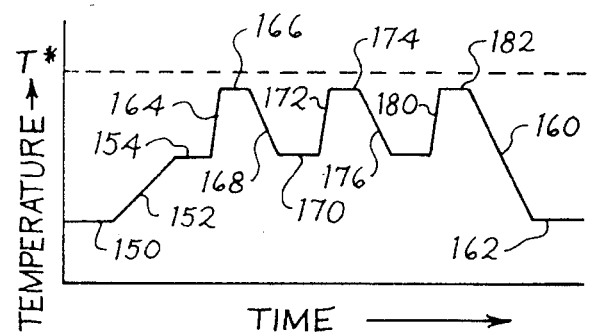

FIG. 2 shows a typical temperature/time profile for a treatment process using a single treatment zone (FIG. 2A) and for a treatment process of the present invention using three treatment zones with cooling between each zone (FIG. 2B). The time/temperature profile in FIG. 2B corresponds to the process depicted in FIG. 1. In both FIGS. 2A and 2B, the temperature T* (also indicated by the dashed lines) represents the predetermined temperature above which unacceptable changes may occur in the flavor, appearance, odor, and/or function of the foodstuff. For a process using a single treatment zone (FIG. 2A), the pumpable foodstuff enters the process at a low temperature 150. Portion 152 represents the increase in temperature in the preheater whereby the temperature rises to a level 154. In the treatment zone, the foodstuff is subjected to an electric field whereby the temperature increases (portion 156) to a final value 158. The total exposure in the treatment system (based on the strengths of electric field and durations of exposure in the individual treatment zones) must be sufficient to provide for sufficient microorganism kill. After the last treatment zone, the temperature of the treated foodstuff is rapidly cooled (portion 160) to a refrigeration temperature 162. As shown in FIG. 2A, the temperature of the foodstuff increases in the treatment zone due to ohmic heating to a level higher than T*. Thus, the foodstuff in the process using a single treatment cell is exposed to temperatures significantly above that in which undesirable changes in flavor, appearance, odor, and/or function of the foodstuff may occur and that exposure is of sufficient duration that such adverse changes will likely occur to an appreciable extent to significantly reduce the quality of the treated foodstuff.

The temperature/time profile shown in FIG. 2B represents the operation of the three treatment zone process illustrated in FIG. 1. For a process using three treatment zones (FIG. 2B), the pumpable foodstuff enters the process at a low temperature 150. Portion 152 represents the increase in temperature in the preheater whereby the temperature rises to a level 154. In the first treatment zone, the foodstuff is subjected to an electric field whereby the temperature increases (portion 164) to a final value 166. The foodstuff is then cooled (portion 168) to a temperature 170 before entering into the second treatment zone. In the second treatment zone, the foodstuff is again subjected to an electric field whereby the temperature increases (portion 172) to a final value 174. The foodstuff is then cooled (portion 176) to a temperature 178 before entering into the third treatment zone. In the third treatment zone, the foodstuff is again subjected to an electric field whereby the temperature increases (portion 180) to a final value 182. After the last treatment zone, the temperature of the treated foodstuff is rapidly cooled (portion 160) to a refrigeration temperature 162. The total exposure (based on the strengths of electric fields and durations of exposure) and the treatment temperature in the three treatment zones must be sufficient to provide for sufficient microorganism kill. Moreover, the maximum temperature to which the foodstuff is exposed (i.e., temperature levels 166, 174, and 182 in the three treatment zones) is, at all times, less than T*. The predetermined temperature T* should be maintained at levels attendant to pulsed electric field treatment which allows sufficient microorganism kill while, at the same time, keeping detrimental changes in the flavor, appearance, odor, or function of the foodstuff to an acceptable level as determined by the desired shelf life and intended use of the foodstuff. For a given level of microorganism kill, the required temperature and exposure time in the present process should be significantly lower than that required in a totally thermal process (e.g., UHT pasteurization) achieving similar microorganism kills. Thus, the foodstuff treated by the process depicted in FIGS. 1 and 2B should have a significantly higher quality than a similar foodstuff treated in process using only thermal effect to achieve a similar microorganism kill level. It should be noted that the exposure to the electric field in any single treatment zone of the process illustrated in FIGS. 1 and 2B may not be sufficient to provide adequate microorganism kill to extend the shelf life of the product to a desired level. Rather, it is exposure over all the treatment zones which provides the improved foodstuff of the present invention. As one skilled in the art will realize, adding additional treatment zones will change the temperature/time profile of FIG. 2B in that additional portions 170, 172, 174, 176, and 178 will occur between the first and last treatment zones for each treatment zone added.

Figure 3:
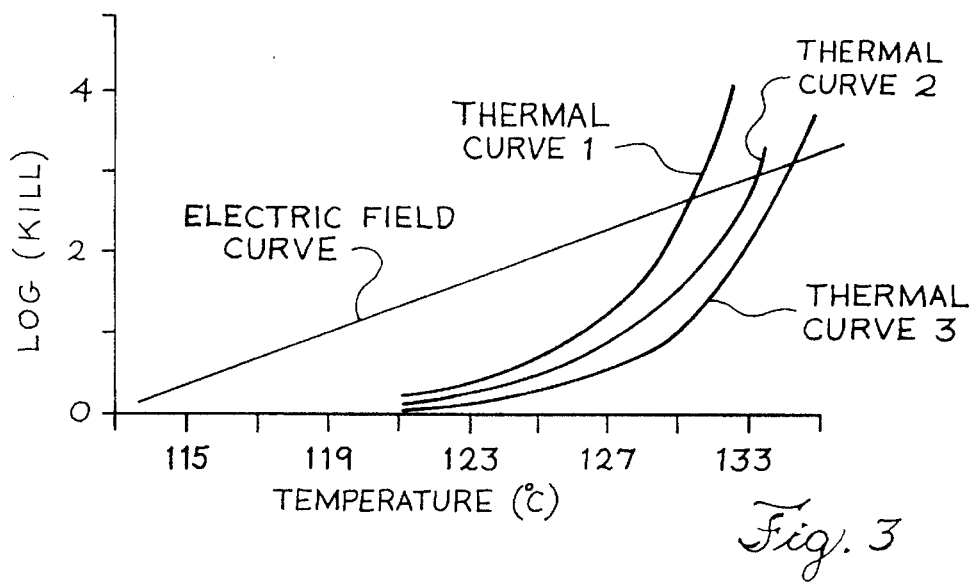
FIG. 3 is a plot comparing the levels of bacteria and bacterial spore kill obtainable using the present invention (labeled Electric Field Curve) and thermal processes (labeled Thermal Curves 1, 2, and 3).

FIG. 3 is a plot comparing the levels of bacteria and bacterial spore kill obtainable using the high temperature process of present invention (labeled Electric Field Curve) and thermal processes (labeled Thermal Curves 1, 2, and 3) such as UHT pasteurization. The Electric Field Curve was generated by treating a phosphate buffer containing *Bacillus stearothermophilus* spores (NFPA/NFL 7-85 spores from the National Food Laboratory of the National Food Processors Association). The spore concentration was about 2×10³ spores/ml. *Bacillus stearothermophilus* spores are generally considered to be resistant and, therefore, are excellent test species for the present invention. Thermal Curves 1, 2, and 3 represent the calculated treatment of *Bacillus stearothermophilus* using a process relying only on thermal treatment and are included for comparison purposes only. These comparative Thermal Curves, each having different holding times, were generated by calculations using the data supplied with the bacterial spore sample and the following equation:

$$\log (\text{kill}) = -t/d_t$$

where t– is the treatment temperature in degrees Centigrade and $d_t$ is a function dependent on the dwell or residence time (in seconds) at t as follows:

$$d_t = D_{121° C.} 10^{(121-t)/z}$$

where $D_{121°}$ C. of the *Bacillus stearothermophilus* suspension provided by the NFPA/NFL equals 120 seconds and z equals 7.2° C. Thermal Curve 1 is based on a holding time of 20 seconds; Thermal Curve 2 is based on a holding time of 12 seconds; and Thermal Curve 3 is based on a holding time of 9 seconds.

The data for the Electric Field Curve was generated using the inventive process with two electric field treatment cells operated at variable field strengths and a pulse rate of 26 hertz (pulses/sec). The treatment cells were as described in U.S. Pat. No. 5,235,905. Before the first treatment cell, the experimental fluid was heated to about 70° C. After each treatment cell in the inventive process, the experimental fluid was cooled to about 70° C. before passage through the next cell. The total holding or treatment time at each temperature referenced was about 8.7 seconds. This total hold time represents the total thermal transit cycle time from entry into the treatment chamber at 70° C. to be heated to each temperature shown and then cooled on exit from the treatment chamber to 5° C. below the maximum treatment or thermal excursion temperature. After passage through the final treatment cell, the experimental fluid was cooled to about 5° C. As can be seen in FIG. 3, comparable kills of bacterial spores can be obtained in the inventive process at significantly lower temperatures and holding times as compared to processes utilizing only thermal energy to kill the bacterial spores. The sporicidal effects in the present invention appear at significantly lower temperatures than predicted from thermal treatment alone. Moreover, the sporicidal effects from the present invention exceed those predicted from thermal treatment alone until temperatures greater than about 130° C. are employed. This represents a significant reduction in the time/temperature combination required to produce bacterial spore kill relative to processes utilizing thermal treatment only. Thus, the use of the present invention can produce a higher quality product with comparable levels of residual bacterial spores but with less detrimental changes in flavor, appearance, odor, and/or function of the food product than processes utilizing only thermal energy.

Similar results have been obtained for the treatment of milk (4 treatment chambers, pulsed electric fields to a maximum temperature of 55° C. at about 30 kV/cm, and flowrates of about 100 l/hr) and orange juice (2 treatment chambers, pulsed electric fields to a maximum temperature of 40° C. at about 30–44 kV/cm, and flowrates of about 100 l/hr). In other words, a higher quality product with comparable levels of residual bacteria or fungi but with less detrimental changes in flavor, appearance, odor, and/or function of the food product could be obtained relative to processes utilizing only thermal energy.

Accordingly, it will be appreciated that improved methods and apparatuses for the preservation of fluid foodstuffs have been provided in accordance with the present disclosure. These improved methods are especially adapted for use with dairy products, fruit juices, and liquid egg products. While the present invention has been particularly described with reference to specific embodiments, it will be appreciated that various modifications and adaptations will be apparent from the present disclosure which are intended to be included within the scope of the accompanying claims.

What is claimed is:

1. A process for preparing a pumpable foodstuff with significantly reduced levels of microorganisms, said process comprising:

(1) preheating a pumpable foodstuff to a temperature in the range of about 30° to 120° C.;

(2) passing the pumpable foodstuff of step (1) through a plurality of treatment zones arranged in series, wherein the pumpable foodstuff is passed through each treatment zone in turn, wherein the pumpable foodstuff in each treatment zone is subjected to multiple pulses of an electric field having a field strength of at least 10 kV/cm;

(3) cooling the pumpable foodstuff after passage through each treatment zone in step (2), except the last treatment zone, so that the temperature of the pumpable foodstuff entering the next treatment zone is in the range of 30° to 130° C.; and (4) rapidly cooling the pumpable foodstuff from the last treatment zone in step (2) to a storage temperature;

wherein the temperature of the pumpable foodstuff in each treatment zone in step (2) is maintained below a predetermined temperature and wherein the total duration of electric field treatment and the temperature of the pumpable foodstuff in the treatment zones are sufficient to provide a foodstuff with significantly reduced microbial levels with minimal changes in the flavor, appearance, odor, or function.

2. A process as defined in claim 1, wherein the predetermined temperature is less than about 100° C.

3. A process as defined in claim 1, wherein the predetermined temperature is less than about 150° C.

4. A process as defined in claim 1, wherein the number of treatment zones is between 2 and 10, inclusive.

5. A process as defined in claim 3, wherein the number of treatment zones is between 2 and 4, inclusive, and wherein the total duration of electric field treatment and the temperature of the pumpable foodstuff in the treatment zones is sufficient to kill essentially all microorganisms in the pumpable foodstuff.

6. A process as defined in claim 4, wherein the pumpable foodstuff is selected from the group consisting of dairy products, fruit juices, and liquid egg products.

7. A process as defined in claim 4, wherein the field strength of the electric field is at least 25 kV/cm.

8. A process as defined in claim 6, wherein the field strength of the electric field is at least 25 kV/cm.

9. A process as defined in claim 4, wherein the pumpable foodstuff is milk and the temperature of the pumpable foodstuff in each treatment zone in step (2) is maintained at a temperature of less than about 80° C.

10. A process as defined in claim 4, wherein the pumpable foodstuff is milk and the temperature of the pumpable foodstuff in each treatment zone in step (2) is maintained at a temperature of less than about 140° C.

11. A process as defined in claim 4, wherein the pumpable foodstuff is a fruit juice and the temperature of the pumpable foodstuff in each treatment zone in step (2) is maintained at a temperature of less than about 80° C.

12. A process as defined in claim 4, wherein the pumpable foodstuff is a fruit juice and the temperature of the pumpable foodstuff in each treatment zone in step (2) is maintained at a temperature of less than about 140° C.

13. A process as defined in claim 4, wherein the pumpable foodstuff is a liquid egg product and the temperature of the pumpable foodstuff in each treatment zone in step (2) is maintained at a temperature of less than about 75° C.

14. A process as defined in claim 1, wherein the pumpable foodstuff from step (4) is aseptically packaged.

15. A process as defined in claim 6, wherein the pumpable foodstuff from step (4) is aseptically packaged.

16. A process as defined in claim 9, wherein the pumpable foodstuff from step (4) is aseptically packaged.

17. A process for preserving a pumpable foodstuff, said process comprising:

(1) passing a pumpable foodstuff through a plurality of treatment zones arranged in series, wherein the pumpable foodstuff is passed through each treatment zone in turn and wherein the pumpable foodstuff is subjected to multiple pulses of electric fields having field strengths of at least 10 kV/cm in the plurality of treatment zones;

(2) cooling the pumpable foodstuff after passage through each treatment zone in step (1), except the last treatment zone, before it enters into the next treatment zone; and (3) rapidly cooling the pumpable foodstuff from the last treatment zone in step (1) to a storage temperature;

wherein the temperature of the pumpable foodstuff in each treatment zone in step (2) is maintained below a predetermined temperature and wherein the total duration of electric field treatment and the temperature of the pumpable foodstuff in the plurality of treatment zones are sufficient to preserve the pumpable foodstuff while minimizing changes in the flavor, appearance, odor, or function of the pumpable foodstuff.

18. A process as defined in claim 17, wherein the predetermined temperature is less than about 100° C.

19. A process as defined in claim 17, wherein the predetermined temperature is less than about 150° C.

20. A process as defined in claim 17, wherein the pumpable foodstuff is heated to a temperature of about 10° to 100° C. before passage into the first treatment zone.

21. A process as defined in claim 17, wherein the number of treatment zones is at between 2 and 10, inclusive.

22. A process as defined in claim 20, wherein the number of treatment zones is between 2 and 4, inclusive, and wherein the total duration of electric field treatment and the temperature of the pumpable foodstuff in the plurality of treatment zones is sufficient to kill essentially all microorganisms in the pumpable foodstuff.

23. A process as defined in claim 17, wherein the pumpable foodstuff is selected from the group consisting of dairy products, fruit juices, and liquid egg products.

24. A process as defined in claim 17, wherein the field strengths of the electric fields are at least 25 kV/cm.

25. A process as defined in claim 23, wherein the field strengths of the electric fields are at least 25 kV/cm.

26. A process as defined in claim 20, wherein the pumpable foodstuff is milk and the temperature of the pumpable foodstuff in each treatment zone in step (2) is maintained at a temperature of less than about 80° C.

27. A process as defined in claim 20, wherein the pumpable foodstuff is milk and the temperature of the pumpable foodstuff in each treatment zone in step (2) is maintained at a temperature of less than about 140° C.

28. A process as defined in claim 20, wherein the pumpable foodstuff is a fruit juice and the temperature of the pumpable foodstuff in each treatment zone in step (2) is maintained at a temperature of less than about 80° C.

29. A process as defined in claim 20, wherein the pumpable foodstuff is a fruit juice and the temperature of the pumpable foodstuff in each treatment zone in step (2) is maintained at a temperature of less than about 140° C.

30. A process as defined in claim 20, wherein the pumpable foodstuff is a liquid egg product and the temperature of the pumpable foodstuff in each treatment zone in step (2) is maintained at a temperature of less than about 75° C.

31. A process as defined in claim 17, wherein the pumpable foodstuff from step (3) is aseptically packaged.

32. A process as defined in claim 20, wherein the pumpable foodstuff from step (3) is aseptically packaged.

33. A process as defined in claim 22, wherein the pumpable foodstuff from step (3) is aseptically packaged.

34. A process as defined in claim 24, wherein the pumpable foodstuff from step (3) is aseptically packaged.

35. A process as defined in claim 25, wherein the pumpable foodstuff from step (3) is aseptically packaged.

* * * * *